United States Patent
Kitsunezuka

(10) Patent No.: US 11,802,932 B2
(45) Date of Patent: Oct. 31, 2023

(54) TRANSMISSION SOURCE POSITION ESTIMATION SYSTEM, TRANSMISSION SOURCE POSITION ESTIMATION METHOD, AND TRANSMISSION SOURCE POSITION ESTIMATION PROGRAM

(71) Applicant: NEC Corporation, Tokyo (JP)

(72) Inventor: Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 674 days.

(21) Appl. No.: 16/977,558

(22) PCT Filed: Mar. 6, 2019

(86) PCT No.: PCT/JP2019/008790
§ 371 (c)(1),
(2) Date: Sep. 2, 2020

(87) PCT Pub. No.: WO2019/172299
PCT Pub. Date: Sep. 12, 2019

(65) Prior Publication Data
US 2021/0048505 A1    Feb. 18, 2021

(30) Foreign Application Priority Data
Mar. 7, 2018  (JP) .................. 2018-041046

(51) Int. Cl.
*G01S 5/02* (2010.01)
(52) U.S. Cl.
CPC ............ *G01S 5/0246* (2020.05); *G01S 5/021* (2013.01); *G01S 5/0215* (2013.01)
(58) Field of Classification Search
CPC ....... G01S 5/0246; G01S 5/021; G01S 5/0215
(Continued)

(56) References Cited

U.S. PATENT DOCUMENTS

| 2004/0061646 A1 | 4/2004 | Andrews et al. |
| 2005/0020277 A1 | 1/2005 | Krumm et al. |

(Continued)

FOREIGN PATENT DOCUMENTS

| EP | 2637034 A1 | 9/2013 |
| JP | 2005-043354 A | 2/2005 |

(Continued)

OTHER PUBLICATIONS

Japanese Office Communication for JP Application No. 2020-505070 dated Sep. 27, 2022 with English Translation.

(Continued)

*Primary Examiner* — Joel Ajayi
(74) *Attorney, Agent, or Firm* — Sughrue Mion, PLLC

(57) ABSTRACT

A transmission source position estimation system includes a sensor and a position estimation apparatus. The sensor is provided with a characteristic vector classification part and an attribute data extraction part. The characteristic vector classification part classifies a set of characteristic vectors obtained from received signal data of a transmitted wave, into subsets in a feature space. The attribute data extraction part extracts attribute data for each of the subsets and outputs the extracted data as an attribute data sequence. The position estimation apparatus is provided with a data combination part and a position estimation part. The data combination part combines attribute data that match or are similar to at least one attribute for a plurality of attribute data sequences. The position estimation part estimates the position of the transmission source from the combined attribute data and the position of the sensor that receives the transmitted wave.

20 Claims, 10 Drawing Sheets

(58) Field of Classification Search
USPC .................................................... 455/456.1
See application file for complete search history.

(56) References Cited

U.S. PATENT DOCUMENTS

| | | |
|---|---|---|
| 2009/0109095 A1 | 4/2009 | Hido et al. |
| 2014/0329540 A1 | 11/2014 | Duggan et al. |
| 2015/0003631 A1 | 1/2015 | Ise et al. |
| 2016/0127931 A1 | 5/2016 | Baxley et al. |

FOREIGN PATENT DOCUMENTS

| | | |
|---|---|---|
| JP | 2006-065703 A | 3/2006 |
| JP | 2006-220487 A | 8/2006 |
| JP | 2007-248217 A | 9/2007 |
| JP | 2009-103633 A | 5/2009 |
| JP | 2014-016291 A | 1/2014 |
| JP | 2016-508217 A | 3/2016 |
| JP | 2016-519288 A | 6/2016 |
| JP | 2016-170032 A | 9/2016 |
| JP | 2017-151220 A | 8/2017 |
| WO | 2014/020921 A1 | 2/2014 |

OTHER PUBLICATIONS

Japanese Office Action for JP Application No. 2020-505070 dated Nov. 16, 2021 with English Translation.
International Search Report for PCT Application No. PCT/JP2019/008790, dated Jun. 11, 2019.

TRANSMISSION SOURCE POSITION ESTIMATION SYSTEM, TRANSMISSION SOURCE POSITION ESTIMATION METHOD, AND TRANSMISSION SOURCE POSITION ESTIMATION PROGRAM

CROSS-REFERENCE TO RELATED APPLICATIONS

This application is a National Stage Entry of PCT/JP2019/008790 filed on Mar. 6, 2019, which claims priority from Japanese Patent Application 2018-041046 filed on Mar. 7, 2018, the contents of all of which are incorporated herein by reference, in their entirety. The present invention relates to a transmission source position estimation system, a transmission source position estimation method, and a transmission source position estimation program.

BACKGROUND

Patent Literature 1 discloses an example of a radio wave transmission source position estimation system. The radio wave transmission source position estimation system disclosed in Patent Literature 1 performs processing to calculate a wave source position using a radio wave received by a plurality of sensors (receivers) multiple times, to obtain a plurality of wave source positions.

As another example, a radio wave source position estimation system disclosed in Patent Literature 2 estimates the position of a transmission source, based on difference of arrival time to a plurality of sensors from transmission source.

In addition, as another example, a radio wave source position estimation system disclosed in Patent Literature 3 detects the position of a mobile unit in real-time, by using at least one transmission tag associated with each tracked mobile unit, and a router/base-station access point device provided with a wireless apparatus enabling communication therewith.

[PTL 1]
  Japanese Patent Kokai Publication No. JP2016-170032A
[PTL 2]
  Japanese Patent Kohyo Publication No. JP2016-508217A
[PTL 3]
  Japanese Patent Kohyo Publication No. JP2016-519288A

SUMMARY

It is to be noted that the respective disclosures of the abovementioned cited technical literature is incorporated herein by reference thereto. The following analysis is given according to the present inventors.

In the technology disclosed in Patent Literature 1 to 3 there are problems in that sensors and peripheral equipment become large in size and difficulties occur in installing the sensors. A reason for this it that normally it is necessary for each sensor to have a plurality of antennas for measuring direction of arrival of radio waves.

It is an object of the present invention to provide a transmission source position estimation system, a transmission source position estimation method, and a transmission source position estimation program, which contribute to estimating radio wave transmission source using a small sized sensor.

According to a first aspect the present invention and disclosure provides transmission source position estimation system comprising: a sensor including a characteristic vector classification part that classifies a set of characteristic vectors obtained from received signal data of a transmitted wave into subsets in feature space; and an attribute data extraction part that extracts attribute data for each of the subsets and outputs the extracted data as attribute data sequences; and a position estimation apparatus including a data combination part that combines matching or similar attribute data for at least one attribute with respect to a plurality of the attribute data sequences; and a position estimation part that estimates the position of a transmission source from the combined attribute data and the position of the sensor that receives the transmitted wave.

According to a second aspect the present invention and disclosure provides a transmission source position estimation method comprising: classifying a set of characteristic vectors obtained from received signal data of a transmitted wave into subsets in feature space; extracting attribute data for each of the subsets and outputting the extracted data as attribute data sequences; combining matching or similar attribute data for at least one attribute with respect to a plurality of the attribute data sequences; and estimating the position of a transmission source from the combined attribute data and the position of a sensor that receives a transmitted wave.

According to a third aspect the present invention and disclosure provides a transmission source position estimation program that causes a computer, installed in a position estimation apparatus, to execute processing comprising: classifying a set of characteristic vectors obtained from received signal data of a transmitted wave into subsets in feature space and extracting attribute data for each of the subsets, to output the extracted data as attribute data sequences; combining matching or similar attribute data for at least one attribute with respect to a plurality of the attribute data sequences; and estimating the position of a transmission source from the combined attribute data and the position of a sensor that receives a transmitted wave. It is to be noted that this program may be recorded on a computer-readable storage medium. The storage medium may be non-transient such as semiconductor memory, a hard disk, a magnetic recording medium, an optical recording medium or the like. The present invention may be embodied as a computer program product.

According to the respective aspects, the present invention and disclosure provides a transmission source position estimation system, a transmission source position estimation method, and a transmission source position estimation program, which contribute to estimating a radio wave transmission source using a small sized sensor.

PREFERRED MODES

Figure 1:
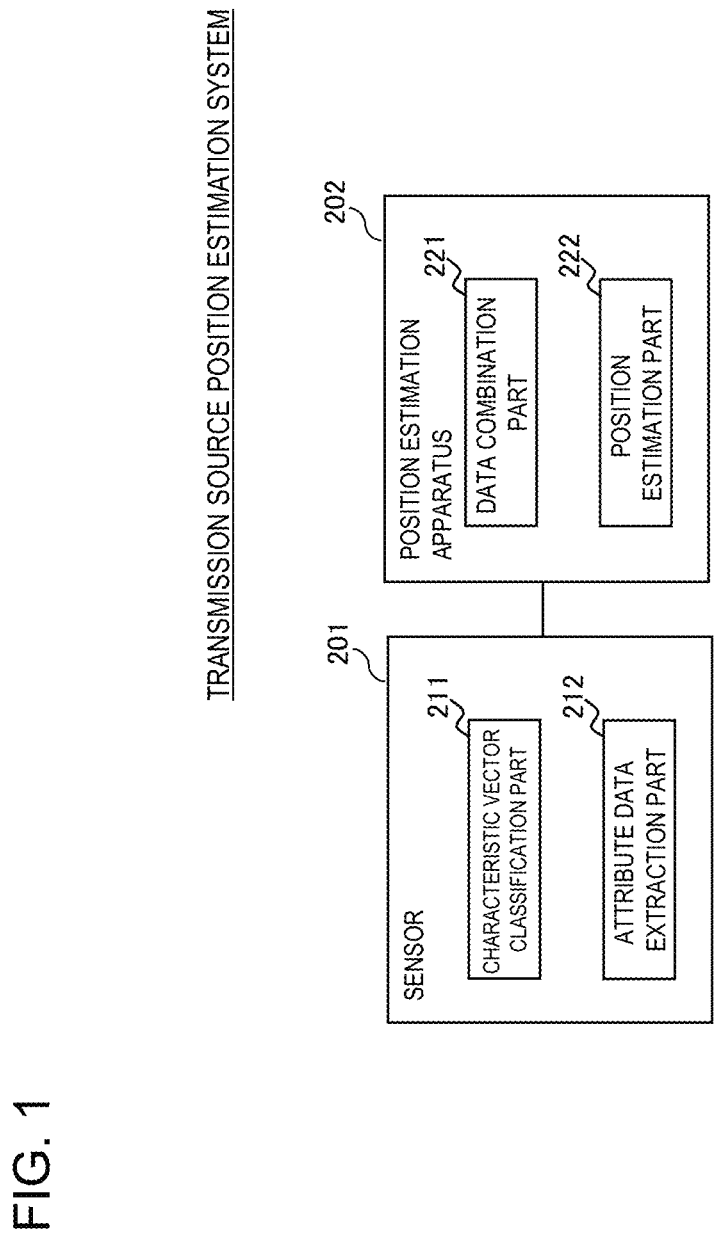
FIG. 1 is a diagram for illustrating an outline of an example embodiment.

First, a description is given concerning an outline of an example embodiment. It is to be noted that reference symbols in the drawings attached to this outline are added to respective elements for convenience as examples in order to aid understanding, and the description of this outline is not intended to limit the invention in any way. Connection lines between blocks in respective diagrams may be bidirectional or unidirectional. Unidirectional arrows schematically show flow of main signals (data), but do not exclude bidirectionality. In addition, although not explicitly disclosed in circuit diagrams, block diagrams, internal configuration diagrams, connection diagrams and the like shown in the disclosure of the present application, input ports and output ports are present at respective input terminals and output terminals of each connection line. The same applies for input output interfaces.

The transmission source position estimation system according to the example embodiment includes a sensor 201 and a position estimation apparatus 202 (refer to FIG. 1). The sensor 201 is provided with a characteristic vector classification part 211 and an attribute data extraction part 212. The characteristic vector classification part 211 classifies a set of characteristic vectors obtained from received signal data of a transmitted wave, into subsets in a feature space. The attribute data extraction part 212 extracts attribute data for each of the subsets and outputs the extracted data as attribute data sequences. The position estimation apparatus 202 is provided with a data combination part 221 and a position estimation part 222. The data combination part 221 combines attribute data that match or are similar for at least one attribute for a plurality of attribute data sequences. The position estimation part 222 estimates the position of the transmission source from the combined attribute data and the position of the sensor 201 that has received the transmitted wave.

The sensor 201 obtains time, frequency and reception intensity data that are measurable for an unknown signal, as elements of a characteristic vector. Additionally, the sensor 201 classifies a set of the characteristic vectors into subsets of a feature space. Furthermore, the sensor 201 extracts and outputs attribute data of respective clusters that have been classified. Even when an unknown signal is targeted, time, frequency, reception intensity data and the like can be measured, and the position estimation apparatus 202 can use the attribute data extracted from the characteristic vector where the time and the like are elements, to estimate the position of a wave source.

Since measurement of direction of arrival of a radio wave at the sensor 201 is not necessarily required, the position of the wave source can be estimated even in a case where the sensor 201 only has a signal antenna. That is, in the transmission source position estimation system (or transmitter location estimation system) shown in FIG. 1, since it is not necessarily required to measure the direction of arrival of the radio wave, and it is possible to use a small sized sensor to measure radio wave intensity, it is possible to solve the problem of the sensor and peripheral equipment thereof becoming large, and the sensor installation being difficult.

A more detailed description is given concerning specific example embodiments below, making reference to the drawings. It is to be noted that in each of the example embodiments, the same symbols are attached to the same configuration elements and descriptions thereof are omitted.

First Example Embodiment

A more detailed description is given concerning a first example embodiment, using the drawings.

Description of Configuration

Figure 2:
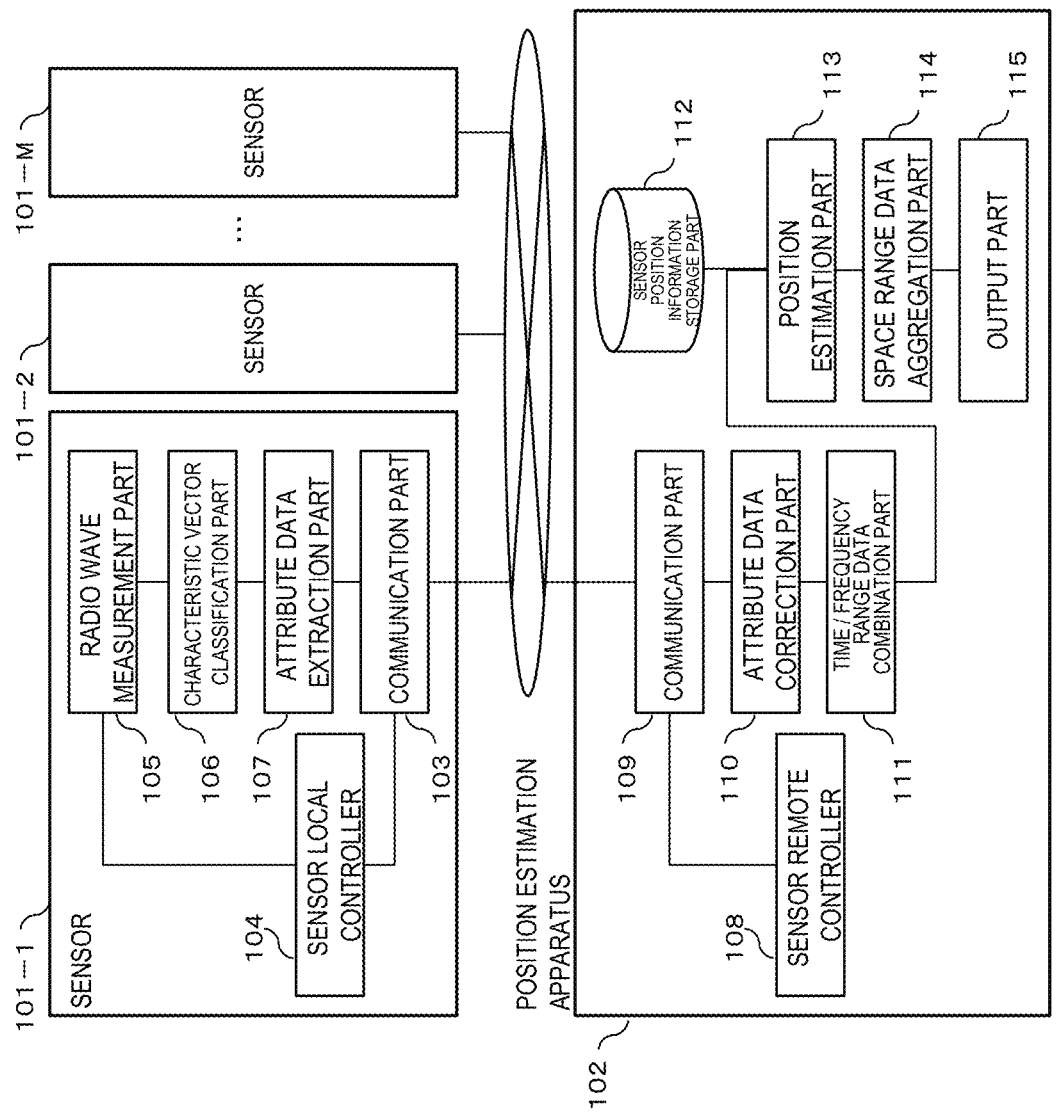
FIG. 2 is a diagram showing an example of a transmission source position estimation system according to a first example embodiment.

FIG. 2 is a diagram showing an example of a transmission source position estimation system according to a first example embodiment. Referring to FIG. 2, the transmission source position estimation system is configured to include a plurality of sensors 101-1 to 101-M (M is a positive integer; the same applies below), and a position estimation apparatus 102. It is to be noted that in a case where there is no particular reason to distinguish between the M sensors 101-1 to 101-M in the description below, the notation "sensor 101" is simply used.

The sensor 101 is disposed geospatially in distributed fashion. The respective sensors (sensor apparatuses) 101 are configured such that communication is possible with the position estimation apparatus 102 via a network.

The position estimation apparatus 102 is an apparatus that controls the sensor 101 and estimates the position (position of transmission source) of a wave source using data outputted by the sensor 101.

The sensor 101 is configured to include a communication part 103, a sensor local controller 104, a radio wave measurement part 105, a characteristic vector classification part 106, and an attribute data extraction part 107.

The communication part 103 is a means that takes charge of communication with the position estimation apparatus 102. That is, the communication part 103 is a processing module that controls communication with the position estimation apparatus 102.

The sensor local controller 104 is a means to set measurement conditions in response to a control signal received from the position estimation apparatus 102 via the communication part 103.

The radio wave measurement part 105 is a means for receiving a radio wave and outputting a set of characteristic vectors, having frequency, time and radio wave intensity as elements, calculated from obtained time series waveform data.

The characteristic vector classification part 106 is a means for classifying a set of characteristic vectors obtained from received signal data of a transmitted wave, into subsets in a feature space. In other words, the characteristic vector classification part 106 performs clustering of characteristic vectors outputted by the radio wave measurement part 105.

The attribute data extraction part 107 is a means for extracting attribute data for each of the subsets and outputting the extracted data as attribute data sequences. More specifically, the attribute data extraction part 107 extracts (obtains) attributes (attribute data) of each of the classified clusters, and transmits the attribute data of the each of the extracted clusters to the position estimation apparatus 102 as attribute data sequences.

It is to be noted that in the disclosure of the present application, a space represented by a characteristic vector is a feature space. Clustering corresponds to an operation of classifying sets of characteristic value vectors into subsets. Furthermore, a cluster corresponds to a subset after classification (after clustering).

The position estimation apparatus 102 includes a sensor remote controller 108, a communication part 109, an attribute data correction part 110, a time/frequency range data combination part 111, a sensor position information storage part 112, a position estimation part 113, a space range data aggregation part 114, and an output part 115.

The sensor remote controller 108 is a means for controlling a measurement condition of each sensor 101.

The communication part 109 is a means for controlling communication with the respective sensors 101. That is, the communication part 109 is in charge of communication for sensor control and obtaining attribute data.

The attribute data correction part 110 is a means for performing matching of attribute data sequences obtained from the respective sensors 101 and correcting time or frequency difference among sensors 101.

The time/frequency range data combination part 111 is a means for combining attribute data that match or are similar for at least one attribute with respect to a plurality of attribute data sequences. More specifically, the time/frequency range data combination part 111 combines attribute data of clusters obtained by the same transmission signals being received by a plurality of sensors 101, in time/frequency ranges.

The sensor position information storage part 112 is a means for holding (storing) positions at which the sensors 101 are installed. In other words, the position of each sensor 101 is grasped in advance, and stored in the sensor position information storage part 112 as sensor position information.

The position estimation part 113 is a means for estimating the position of the transmission source from the combined attribute data and the position (sensor position information) of the sensor 101 that has received the transmitted wave.

The space range data aggregation part 114 is a means for aggregating overlapping of wave source positions outputted by the position estimation part 113, in a space range. More specifically, the space range data aggregation part 114 aggregates the overlapping of the wave source position estimation data caused by the same wave source transmitting multiple signals, in a space range.

The output part 115 is a means for outputting an estimated wave source position to a screen or file.

It is to be noted that the time/frequency range data combination part 111 is an example of a data combination part. The space range data aggregation part 114 is an example of a data aggregation part.

Description of Operations

Next, a description is given concerning overall operations of the transmission source position estimation system according to the first example embodiment, making reference to the drawings.

Figure 3:
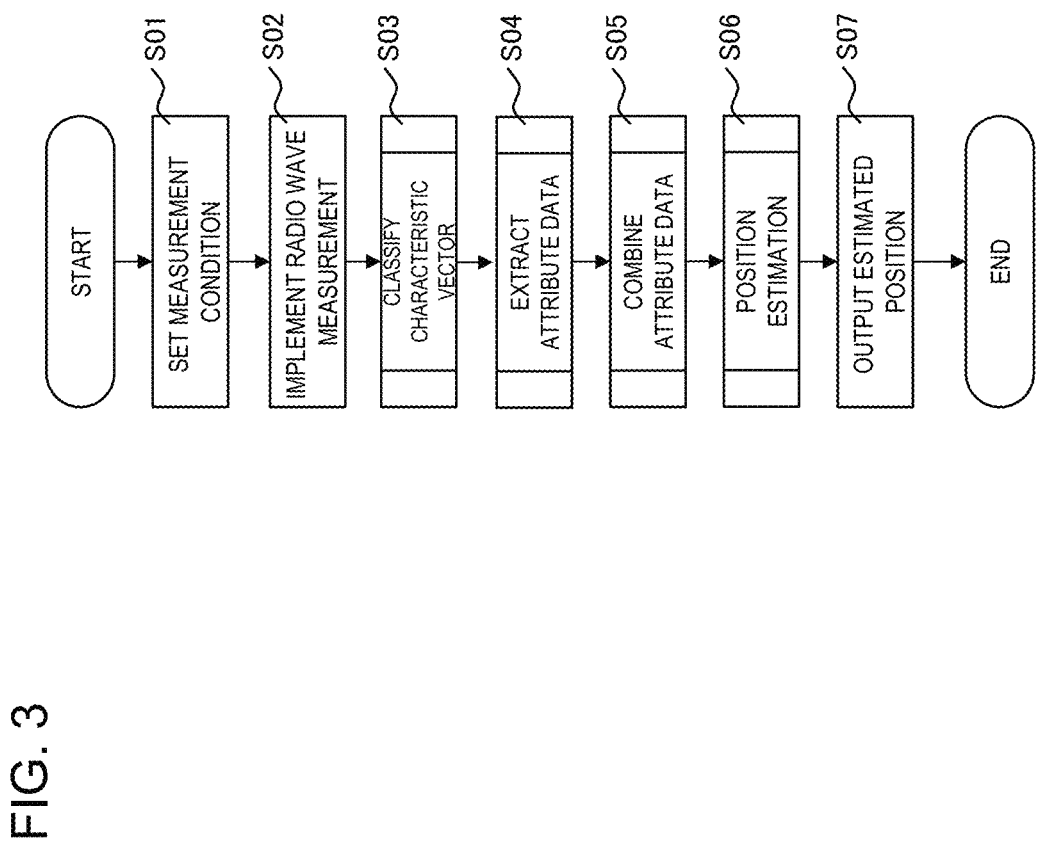
FIG. 3 is a flowchart showing an example of operations of a transmission source position estimation system according to the first example embodiment.

FIG. 3 is a flowchart showing an example of operations of the transmission source position estimation system according to the first example embodiment.

In step S01, the position estimation apparatus 102 (sensor remote controller 108) specifies a prescribed frequency band, time period, and sensor setting, and sets the relevant specified measurement condition(s) in each of the respective sensors 101. It is to be noted that examples of sensor settings (measurement conditions) may be gain of an amplifier contained in the sensor 101, filter bandwidth, sampling frequency of analog-digital converter, frequency resolution, number of times measurement is averaged, or the like.

The sensor 101 implements measurement of radio wave under a measurement condition specified by the position estimation apparatus 102 (step S02). Measurement results may be: time at which a radio wave is received, the frequency of a received radio wave, or the intensity of a received radio wave.

Here, time, frequency and intensity obtained by measuring are examples of characteristic vector elements. A characteristic vector with these as elements is obtained, for example, by making a time series Fourier transform of radio wave reception waveform data (time series data).

Figure 4:
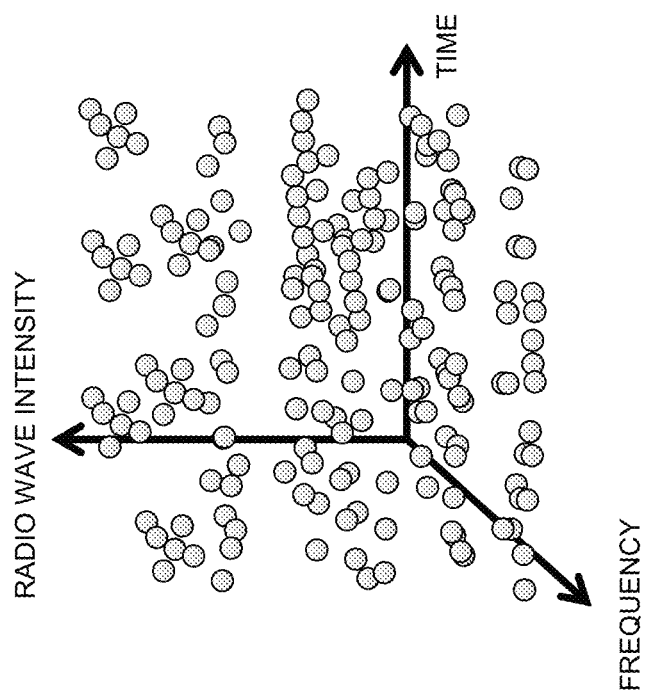
FIG. 4 is a diagram showing an example mapping characteristic vectors to a feature space.

FIG. 4 is a diagram showing an example mapping characteristic vectors to a feature space.

The description returns to FIG. 3. In step S03, the sensor 101 classifies sets of obtained characteristic vectors into clusters (subsets) in a feature space.

Figure 5:
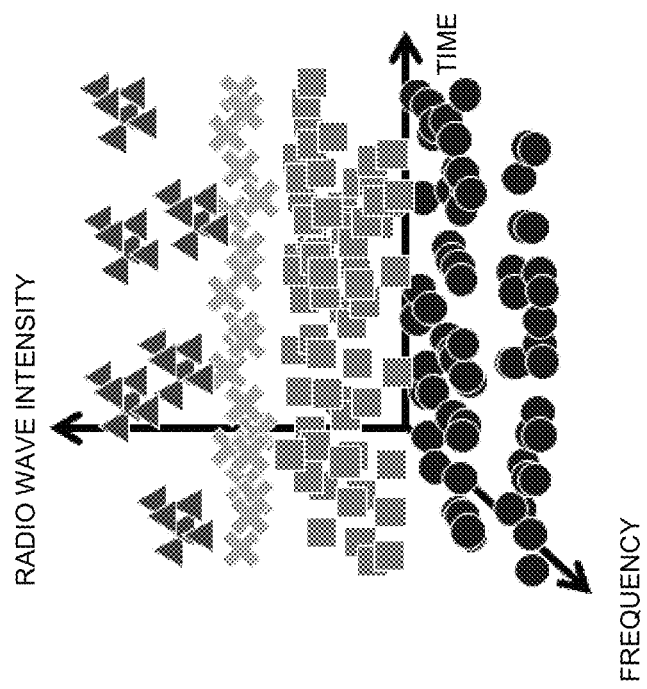
FIG. 5 is a diagram showing an example of classified characteristic vectors.

FIG. 5 is a diagram showing an example of classified characteristic vectors. In FIG. 5, for Δ, X, □, ○, the same symbol indicates classification in the same cluster. It is to be noted that as described later, characteristic vectors where radio wave intensity is low are removed as noise components, but in FIG. 5, characteristic vectors corresponding to removed noise components are also plotted.

The description returns to FIG. 3. In step S04, the sensor 101 extracts attribute data of respective clusters (subsets) that have been classified. On this occasion, in a case where the characteristic vectors are classified into a plurality of clusters, the sensor 101 extracts attribute data sequences with the number of sequences corresponding to the number of clusters, and outputs to the position estimation apparatus 102.

In step S05, the position estimation apparatus 102 combines attribute data obtained from the plurality of sensors 101.

Thereafter, the position estimation apparatus 102 estimates the position of the transmission source using the combined attribute data and sensor position information of the respective sensors 101 (step S06).

In step S07, the position estimation apparatus 102 outputs the estimated position of the transmission source to a file or screen.

Next, a detailed description is given concerning characteristic vector classification and attribute data extraction described in steps S03, S04 of FIG. 3.

Figure 6:
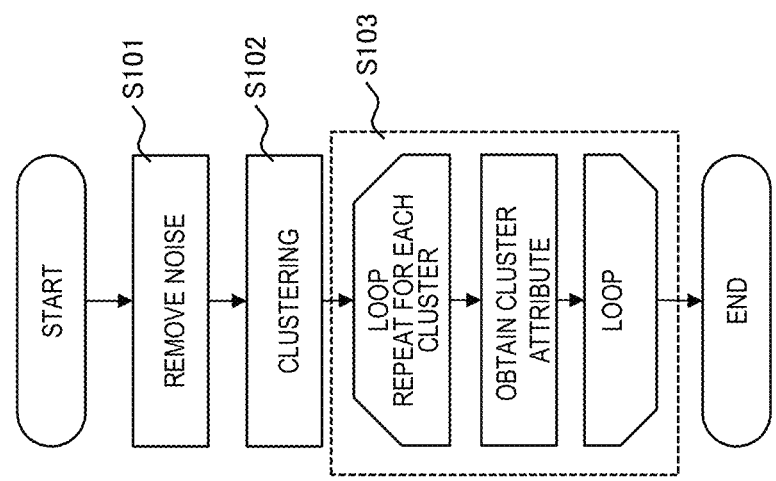
FIG. 6 is a flowchart showing an example of operations related to characteristic vector classification and attribute data extraction, with regard to a sensor.

FIG. 6 is a flowchart showing an example of operations related to characteristic vector classification and attribute data extraction, for the sensor 101.

In step S101, the characteristic vector classification part 106 removes characteristic vectors where radio wave intensity is less than or equal to a prescribed threshold (given threshold), as noise components.

In step S102, the characteristic vector classification part 106 performs clustering on set of characteristic vectors.

Various methods may be used in clustering by the characteristic vector classification part 106. The characteristic vector classification part 106 preferably uses a method that may also be applied to a case where the number of clusters is unknown. For example, the characteristic vector classification part 106 may use an X-means method, a MeanShift method, or a method of clustering by Variational Bayesian Gaussian Mixture Model (VBGMM).

Or, according to measurement environment including measurement time, frequency and place, in a case where the number of received signals is already known, the characteristic vector classification part 106 may perform clustering in a case where the number of clusters is already known. A K-means method is representative of methods of clustering in the case where the number of clusters is already known.

In a case where the characteristic vectors are classified into a plurality of clusters, loop processing of step S103 is performed.

In the loop processing of step S103, for the i-th cluster (i is a positive integer; the same applies below), an identifier of the relevant i-th cluster and attribute data of the cluster are obtained. In other words, the attribute data extraction part 107, along with obtaining (generating) the identifier of each cluster, obtains (calculates) attribute data from each cluster.

Cluster representative values (vector with cluster representative values as elements), variance or covariance, number of samples, etc. are cited as examples of cluster attribute data. Mean, median or mode of the relevant cluster may be used as a cluster representative value.

Other cluster attribute elements may include statistics such as maximum, minimum, variance, kurtosis, skewness, or the like, statistical moment, cumulant or the like, of a feature space or a subspace thereof. In a case where modulation scheme or preamble information is obtained from the characteristic vector, these may be included as cluster attribute elements.

It is to be noted that in the description below, an attribute data sequence obtained by the m-th sensor 101 (m is a positive integer less than or equal to M; the same applies below) is denoted as simply an attribute data sequence of sensor m.

In the abovementioned description noise is removed before clustering, but it is also possible to perform clustering including characteristic vectors corresponding to noise components, and to remove clusters corresponding to the noise components after extracting attribute data. For example, referring to reception intensity that is a cluster representative vector element, in a case where the relevant value is less than or equal to a threshold, it may be determined that the cluster is one that corresponds to a noise component.

Next, a detailed description is given concerning combining attribute data described in steps S05 and S06 of FIG. 3, and position estimation, making reference to the drawings.

Figure 7:
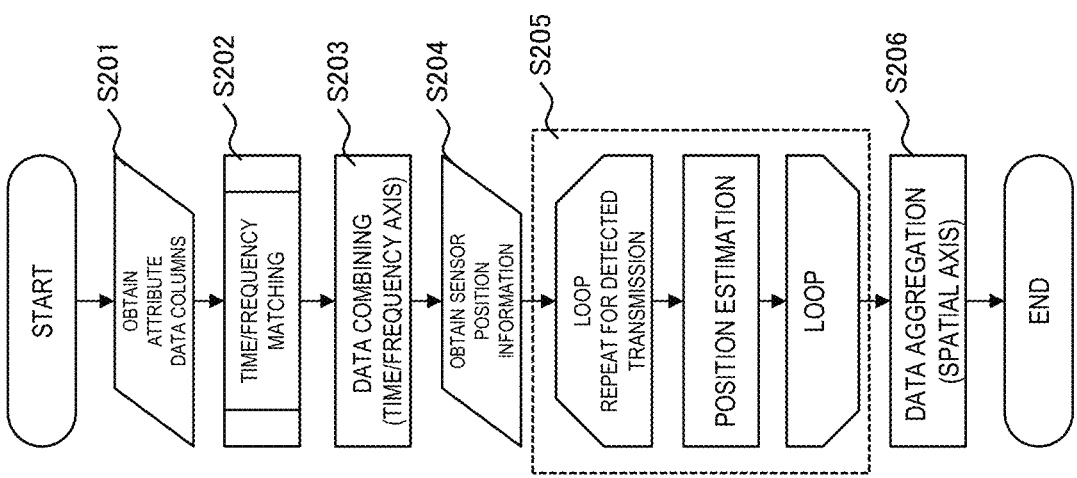
FIG. 7 is a flowchart showing an example of operations related to data combining and position estimating in a position estimation apparatus.

FIG. 7 is a flowchart showing an example of operations related to data combining and position estimating of the position estimation apparatus 102.

In step S201, the communication part 109 obtains attribute data sequences from the plurality of sensors 101.

Thereafter, the attribute data correction part 110 performs time/frequency matching among attribute data sequences (step S202).

Time or frequency difference among the respective sensors 101 is corrected by the relevant matching processing. Details of the matching processing are described later. It is to be noted that the matching processing (correction processing) in step S202 may be omitted in a case where time and frequency accuracy are sufficiently high for the respective sensors 101.

Thereafter, the time/frequency range data combination part 111 combines attribute data corresponding to overlapping received signals with regard to the plurality of sensors 101, among attribute data included in the attribute data sequences where frequency difference and the like has been corrected (step S203).

Regarding whether or not the attribute data are combined, the time/frequency range data combination part 111 may make a determination by, for example, comparing time or frequency error of respective cluster representative vectors, and a specified threshold. For example, in a case where time or frequency error is smaller than the threshold, the time/frequency range data combination part 111 determines that the same transmitted wave has been received by a plurality of sensors 101, and combines the attribute data.

As a result of the processing of step S203 being executed, on receiving V signals (received V times; V is a positive integer; the same applies below) from M sensors, an M×V sized matrix is arranged with cluster attribute data as elements. Here, in a case where the v-th cluster signal (v is a positive integer less than or equal to V; the same applies below) cannot be received by the m-th sensor, there is no attribute data in row m, sequence v (None).

Next, the position estimation part 113 obtains installation position information (sensor position information) of M sensors 101 from the sensor position information storage part 112 (step S204).

Thereafter, the position estimation part 113 uses attribute data combined with position information of the M sensors that have been obtained, to estimate the position of the transmission source of the V received signals (loop of step S205). The position estimation part 113 uses a normal wave source position estimation method (position estimation algorithm) based on radio wave intensity, such as maximum likelihood method, least-squares method or the like, to estimate the position of the transmission source. Or, the position estimation part 113 may also use a method of estimating wave source path, as represented by a particle filter or Kalman filter.

Thereafter, the space range data aggregation part 114 aggregates, from among an estimated V transmission source positions, items for which the spatial distance is less than a given threshold (step S206).

The aggregation processing assumes that the same transmission source transmits a radio wave multiple times within a measuring period. It is to be noted that the space range data aggregation part 114 may also determine whether or not to use similarity degree of attribute data to perform aggregation, outside of estimated position distance. The threshold may be given in units of length, or may be given by ratio with respect to position estimation accuracy.

Next, a detailed description is given concerning time/frequency matching described in step S202 of FIG. 7, making reference to the drawings.

Figure 8:
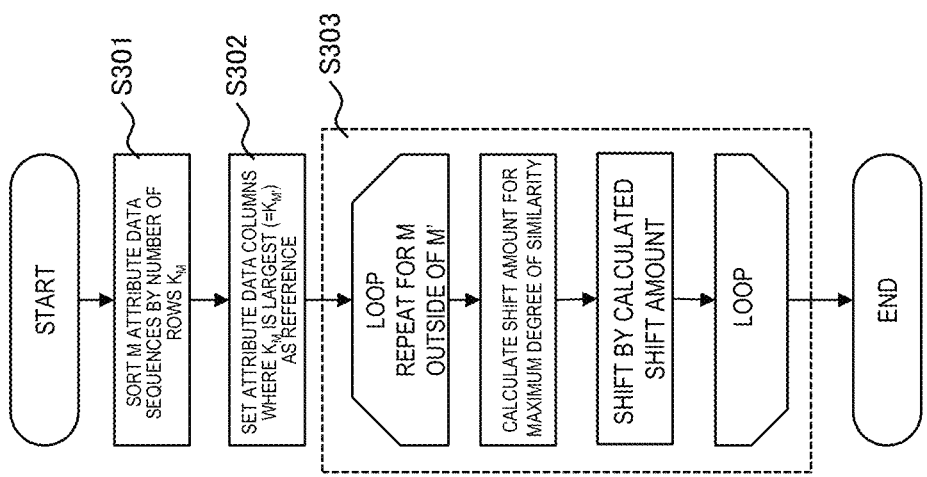
FIG. 8 is a flowchart showing an example of time/frequency matching operations of a position estimation apparatus.

FIG. 8 is a flowchart showing an example of time/frequency matching operations of the position estimation apparatus 102.

The attribute data correction part 110 sorts M attribute data sequences in order of larger number of sequences thereof (corresponding to number of clusters) (step S301). Here, the number of attribute data sequences of sensor m is $K_m$, and sensor m' gives the largest $K_m$ ($K_m$ is a positive integer; the same applies below).

In step S302, the attribute data correction part 110, sets an attribute data sequence of sensor m' as a reference. This corresponds to having the attribute data sequence of sensor m' as a first attribute data sequence.

Next, the attribute data correction part 110 performs the following processing on an attribute data sequence of sensor m outside of the m'-th one, in loop processing of step S303.

It is to be noted that the attribute data sequence of sensor m corresponds to a second attribute data sequence outside of the first attribute data sequence included in a plurality of attribute data sequences.

The attribute data correction part 110 calculates degree of similarity with the reference attribute data sequence, while collectively parallel-displacing (shifting) $K_m$ cluster representative vectors included in the attribute data sequences, in a feature space or a subspace thereof (for example, time axis and frequency axis).

Thereafter the attribute data correction part 110 calculates shift amount with largest degree of similarity.

Next, the attribute data correction part 110 shifts a representative vector of respective attribute data by the calculated shift amount. By this shift processing, with sensor m' as reference, differences of sensor-specific time or frequency outside of this may be corrected.

In this way, the attribute data correction part 110 corrects the second attribute data sequence so as to have maximum degree of similarity of the second attribute data sequence (attribute data sequence of sensor m) with respect to the first attribute data sequence (attribute data sequence of sensor m') included in a plurality of attribute data sequences.

In the above description, an attribute data sequence giving maximum $K_m$ is selected in the first attribute data sequence as reference, but the way of selecting the first attribute data sequence is not limited thereto. For example, in a feature space or a subspace thereof, for example, time axis or frequency axis, an attribute data sequence with maximum entropy or information quantity corresponding to obtaining an attribute data sequence of sensor m, may be a reference. It is to be noted that when the probability of a certain event E occurring is P(E), the information quantity corresponding to the event E occurring is represented as $-\log(P(E))$. The entropy is represented by expected value of information quantity included in a certain event series A.

As degree of similarity, it is possible to use cosine similarity degree or Pearson correlation coefficient with regard to linear combination or non-linear combination vector for $K_m$ cluster representative vectors included in attribute data sequences. Or, use may be made of distance such as Euclidean distance, Mahalanobis distance, or Minkowski distance, the smaller the distance having the higher the degree of similarity.

The attribute data correction part 110 may use overlapping of statistical models. Specifically, for the attribute data correction part 110, $K_m$ clusters included in attribute data sequences have a close resemblance, with a statistical model that uses representative vectors and variance or covariance thereof. In addition, the attribute data correction part 110 may maximize correlation of overlapping of $K_m'$ statistical models corresponding to attribute data sequences of sensor m' which is a reference, and overlapping of $K_m$ statistical models corresponding to attribute data sequences of sensor m. A Gaussian model may be cited as an example of a statistical model.

It is to be noted that correction processing by the attribute data correction part 110 may perform correction of either one of a time axis or a frequency axis. Correction including expansion or reduction or rotation within a feature space may also be performed rather than only shifting.

Description of Effect

A description is given concerning an effect of the transmission source position estimation system according to the first example embodiment.

In the first example embodiment, each sensor 101 is configured to obtain and classify measurable time, frequency and reception intensity data for unknown signals also, and to extract and output attribute data of each of the classified clusters. Accordingly, even when an unknown signal is a target, or the sensor 101 does not have a large capacity data communication function, it is possible to perform position estimation for a wave source. Since measurement of direction of arrival of radio wave in the respective sensors 101 is not necessarily required, the position of the wave source can be estimated even in a case where the sensor 101 only has a single antenna.

In the first example embodiment, by using a characteristic vector obtained by reception using one antenna, for example, reception intensity of a radio wave, measurement of direction of arrival is not necessarily required. As a result, it is possible to estimate the position of a transmission source by using a small sized sensor 101. In this way, in the first example embodiment, since it is not necessarily required to measure the direction of arrival of the radio wave, and it is possible to use a small size sensor to measure radio wave intensity, it is possible to solve the problems of the sensor and peripheral equipment thereof becoming large, and difficulties occurring in installation of the sensors.

In addition, in the first example embodiment, the position estimation apparatus 102 corrects error among attribute data sequences due to differences of time or frequency among the sensors 101, and combines the attribute data originating from the same transmitted wave. In addition, the position estimation apparatus 102 according to the first example embodiment is configured to estimate and output transmission source position from sensor position and reception intensity included in the relevant combined attribute data. Therefore, the position estimation apparatus 102 can estimate the position of a transmission source, even if there is a difference in time or frequency among plural sensors 101.

In the systems disclosed in the abovementioned patent literature 1 to 3, there is a problem of sensor operation cost increasing. The reason for this is as follows. In the abovementioned radio wave transmission source estimation system, it is necessary to measure difference of time of arrival of radio waves from a transmission source to a plurality of sensors, based on calculation of correlation of time series data. Therefore, highly accurate synchronization of time among plural sensors and large capacity data communication for time series data transmission is necessary. As a result, operation cost of sensors increases. Or, there is a problem in that it is difficult to collect data by wireless connection of sensors, and installation of sensors is difficult.

In this regard, in the transmission source position estimation system according to the first example embodiment, a characteristic vector set is classified into subsets in feature space, and attribute data of the subsets is extracted. In the transmission source position estimation system according to the first example embodiment, on correcting error existing among attribute data sequences outputted to each sensor 101, for example error in time or frequency among the sensors, position estimation of transmission source is performed. As a result, highly accurate time synchronization or large volume data communication among the sensors 101 is unnecessary, and it is possible to curb the operational cost of the sensors 101. An effect is obtained of wireless connectivity being made possible and installability of the sensors being improved.

In the systems disclosed in Patent Literature 1 to 3, there is a problem in that, in a case where a signal transmitted by a transmission source is unknown, position estimation accuracy deteriorates. A reason for this is that basically a signal that can be referred to is not present, or even where a signal that can be referred to is included, if such a signal is unknown, it cannot be used in position estimation.

In this regard, in the transmission source position estimation system according to the first example embodiment, even with an unknown radio wave signal, from degree of similarity related to measurable time or frequency, attribute data originating from the same transmitted wave are combined, and transmission source position is estimated from reception intensity of radio waves included the combined attribute data. As a result, in the transmission source position estimation system according to the first example embodiment, it is possible to estimate the position of a transmission source with high accuracy even with an unknown radio wave signal.

Effects of the transmission source position estimation system according to the first example embodiment described above are summarized as below. In the first example embodiment, a system and method are provided such that the sensors 101 receiving a radio wave are arranged in a dispersed manner, and the position of the transmission source of the radio wave is estimated. In particular, in an environment where a plurality of radio wave transmission sources are present, or in a state where a transmission source transmits a radio wave of unknown form, by using only information of the position of the sensor 101 and the intensity of the received radio wave, it is possible to provide a transmission source position estimation system that can estimate each transmission source position. In this way, the first example embodiment provides a transmission source position estimation system where installation is easy and operational cost is low, using sensors 101 that are small sized and in which information can be collected by wireless communication. The first example embodiment provides a transmission source position estimation system that can improve radio wave source position estimation accuracy even in a case where a signal is unknown.

Second Example Embodiment

Next, a detailed description is given concerning a second example embodiment, making reference to the drawings.

Figure 9:
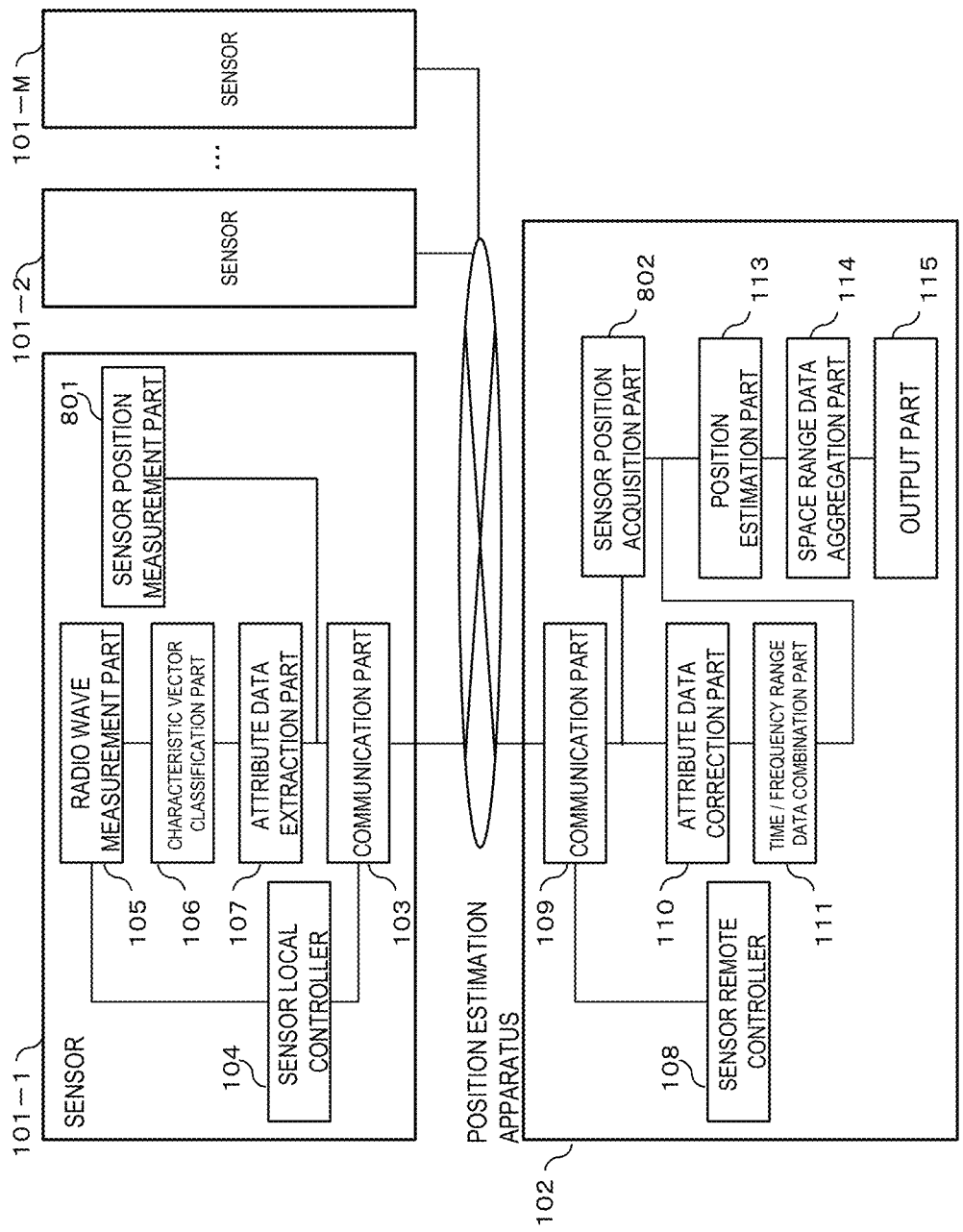
FIG. 9 is a diagram showing an example of a transmission source position estimation system according to a second example embodiment.

FIG. 9 is a diagram showing an example of a transmission source position estimation system according to a second example embodiment. Comparing FIG. 9 with FIG. 2, in the second example embodiment a sensor 101 is provided with a sensor position measurement part 801, and a sensor position information storage part 112 of a position estimation apparatus 102 is replaced by a sensor position acquisition part 802.

Overall operations of the transmission source position estimation system according to the second example embodiment may be the same as overall operations of the wave source position estimation system according to the first example embodiment, except for the following points. Accordingly, a detailed description concerning operations of the transmission source position estimation system according to the second example embodiment is omitted. In the second example embodiment, rather than sensor position information being stored in advance in the sensor position information storage part 112, measurement is performed by the sensor position measurement part 801. In the second example embodiment, the position of respective sensors 101 is obtained by the sensor position acquisition part 802, and the position estimation part 113 performs position estimation according to information obtained by the sensor position acquisition part 802.

The sensor position measurement part 801 calculates the position of its own apparatus (sensor 101) by a GPS (Global Positioning System) signal or the like, and transmits a result thereof to the position estimation part 113. The sensor position acquisition part 802 obtains sensor position transmitted by the sensor 101, to be stored in a storage medium. The sensor position acquisition part 802, in a case where the position of respective sensors 101 is updated, reflects the latest position information in information of the storage medium or the like.

Description of Effect

A description is given concerning an effect of the second example embodiment.

In the second example embodiment, since the sensor 101 is configured so as be able to measure its own position, it is not necessary to install the sensor 101 in a fixed manner. For example, even if the sensor 101 moves (or is moved), by each sensor 101 transmitting the position of its own apparatus to the position estimation apparatus 102, the position estimation apparatus 102 can estimate a radio wave transmission source position.

Continuing, a description is given concerning hardware of the position estimation apparatus 102 according to the first and the second example embodiments.

Figure 10:
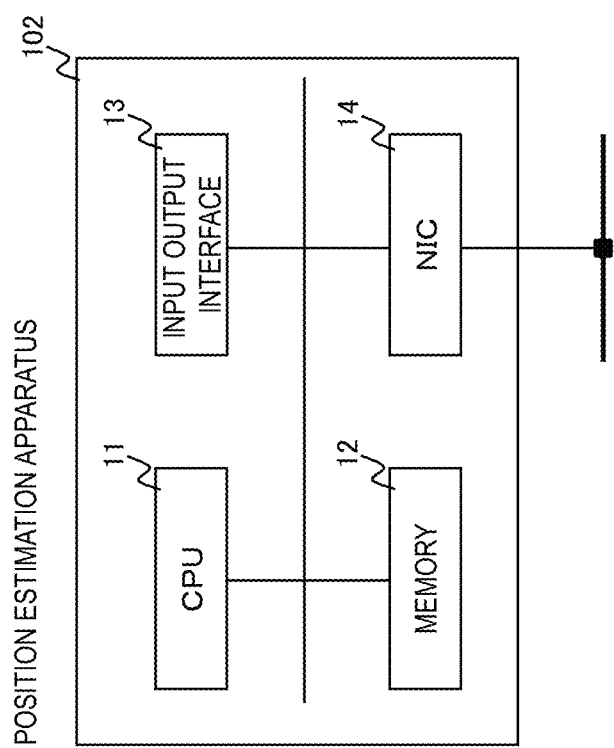
FIG. 10 is a diagram showing an example of hardware of a position estimation apparatus according to the first example embodiment.

FIG. 10 is a diagram showing an example of hardware of a position estimation apparatus 102 according to the first example embodiment. The position estimation apparatus 102 may be configured by a so-called information processing apparatus (computer), and is provided with a configuration exemplified in FIG. 10. For example, the position estimation apparatus 102 is provided with a CPU (Central Processing Unit) 11, a memory 12, an input-output interface 13 and an NIC (Network Interface Card) 14 that is a communication means, connected together by an internal bus.

It is to be noted that the configuration shown in FIG. 10 is not limited to the hardware configuration of the position estimation apparatus 102. The position estimation apparatus 102 may include hardware not shown in the drawings. Or, the number of CPUs included in the position estimation apparatus 102 is not limited to the example shown in FIG. 10, and for example, a plurality of CPUs may be included in the position estimation apparatus 102.

The memory 12 may be RAM (Random Access Memory), ROM (Read Only Memory), or an auxiliary storage apparatus (hard disk or the like).

The input-output interface 13 is a means that forms an interface for a display apparatus or input apparatus not shown in the drawings. The display apparatus is, for example, a liquid crystal monitor or the like. The input apparatus is, for example, an apparatus that receives a user operation such as that of a keyboard, a mouse, or the like.

Functionality of the position estimation apparatus 102 is realized by the abovementioned processing modules. The processing modules in question, for example, are realized by the CPU 11 executing a program stored in the memory 12. Or, the entire processing module or a part thereof may be realized by hardware such as a FPGA (Field Programmable Gate Array) or ASIC (Application Specific Integrated Circuit). The abovementioned program may be downloaded via a network, or may be updated using a storage medium that stores a program. Furthermore, the abovementioned processing modules may be realized by a semiconductor chip. That is, it is sufficient if functions performed by the abovementioned processing modules are realized by software being executed in some type of hardware.

It is possible to cause a computer to function as the position estimation apparatus 102 by installing the abovementioned computer program (transmission source position estimation program) in the computer storage part. In addition, by causing the abovementioned computer program to be executed by a computer, it is possible to execute the transmission source position estimation method by the computer.

It is to be noted that since the basic hardware configuration of the sensor 101 may be the same as the position estimation apparatus 102, a detailed description is omitted. Specifically, in the configuration shown in FIG. 10, it is possible to have the sensor 101 by a change with respect to the input-output interface 13 and providing a receiving circuit and antenna to receive a radio wave.

In the multiple flowcharts used as described above, a plurality of steps (processes) were described in order, but the order of executing the steps executed in the various example embodiments is not limited to the order described. In the various example embodiments, modification is possible within a scope where there is no substantive interference in the order of the illustrated steps, such as executing the respective processes in parallel. The various example embodiments described above may be combined within a scope that does not conflict with the content.

According to the abovementioned description, the industrial applicability of the present invention is clear. In particular, by estimating the position and transmission range of wireless stations of a certain wireless system, and by utilizing frequency used by the system in another different area, a preferred application is realized whereby frequency, which is a limited resource, is effectively utilized. Application is also possible for the purpose of estimating the position of an unlawful or illegal radio wave transmission source, and performing appropriate steps.

Some of all of the abovementioned example embodiments may also be described as in the following, but there is no limitation to the following.

Mode 1

As in the transmission source position estimation system according to the first aspect described above.

Mode 2

The transmission source position estimation system preferably according to Mode 1, wherein the position estimation apparatus is further provided with an attribute data correction part which, for a first attribute data sequence included in a plurality of the attribute data sequences, in order to maximize similarity degree of a second attribute data sequence outside of the first attribute data sequence, corrects the second attribute data sequence.

Mode 3

The transmission source position estimation system preferably according to Mode 2, wherein each of the plurality of attribute data sequences includes a representative vector of the subsets of characteristic vectors as an element, and the attribute data correction part corrects the representative vector of the second attribute data sequence, in order to maximize similarity degree of the representative vector of the first attribute data sequence and the representative vector of the second attribute data sequence, in a feature space or subspace of a feature space.

Mode 4

The transmission source position estimation system preferably according to Mode 3, wherein the attribute data further includes variance or covariance of a subset of the characteristic vectors in a feature space as an element, and the attribute data correction part approximates the subset of the characteristic vectors in a statistical model that uses representative vector and variance or covariance of corresponding attribute data, and corrects the representative vector of the second attribute data sequence, in order to maximize correlation between overlapping of a statistical model corresponding to the first attribute data sequence and overlapping of a statistical model corresponding to the second attribute data sequence.

Mode 5

The transmission source position estimation system preferably according to any one of Modes 2 to 4, wherein an attribute data sequence where the number of attribute data sequences is largest among the plurality of attribute data sequences, is the first attribute data sequence.

Mode 6

The transmission source position estimation system preferably according to any one of Modes 2 to 4, wherein an attribute data sequence where information amount or entropy is largest among the plurality of attribute data sequences, is the first attribute data sequence.

Mode 7

The transmission source position estimation system preferably according to any one of Modes 1 to 6, wherein the characteristic vector includes receipt time, reception frequency and reception intensity as elements.

Mode 8

The transmission source position estimation system preferably according to any one of Modes 1 to 7, wherein the position estimation apparatus is further provided a data aggregation part that aggregates overlapping of wave source positions outputted by the position estimation part in a space range.

Mode 9

The transmission source position estimation system preferably according to Mode 8, wherein the data aggregation part aggregates and outputs wave source positions at distances closer than a given threshold, among wave source positions outputted by the position estimation part.

Mode 10

A sensor provided with a characteristic vector classification part that classifies sets of characteristic vectors obtained from received signal data of a transmitted wave into subsets in a feature space, and an attribute data extraction part that extracts attribute data for each of the subsets and outputs the extracted data as an attribute data sequence.

Mode 11

A position estimation apparatus provided with: a communication part wherein a sensor classifies a set of characteristic vectors obtained from received signal data of a transmitted wave into subsets in feature space, and extracts attribute data for each of the subsets and outputs the extracted data as attribute data sequences; a data combination part that combines matching or similar attribute data for at least one attribute with respect to a plurality of the attribute data sequences; and a position estimation part that estimates the position of a transmission source from the combined attribute data and the position of the sensor that receives the transmitted wave.

Mode 12

As in the transmission source position estimation method according to the second aspect described above.

Mode 13

As in the transmission source position estimation program according to the third aspect described above.

It is to be noted that Modes 10 to 13 may be extended as in Modes 2 to 9, similar to the first mode.

It is to be noted that the various disclosures of the cited patent literature described above are incorporated herein by reference thereto. Modifications and adjustments of example embodiments and examples may be made within the bounds of the entire disclosure (including the scope of the claims) of the present invention, and also based on fundamental technological concepts thereof. Various combinations and selections (including at least some non-selections) of various disclosed elements (including respective elements of the respective claims, respective elements of the respective example embodiments and examples, respective elements of the respective drawings and the like) are possible within the scope of the disclosure of the present invention. That is, the present invention clearly includes every type of transformation and modification that a person skilled in the art can realize according to the entire disclosure including the scope of the claims and to technological concepts thereof. In particular, with regard to numerical ranges described in the present application, arbitrary numerical values and small ranges included in the relevant ranges should be interpreted to be specifically described even where there is no particular description thereof.

REFERENCE SIGNS LIST

11 CPU (Central Processing Unit)
12 memory
13 input output interface
14 NIC (Network Interface Card)
101, 101-1 to 101-M, 201 sensor
102, 202 position estimation apparatus
103, 109 communication part
104 sensor local controller
105 radio wave measurement part
106, 211 characteristic vector classification part
107, 212 attribute data extraction part
108 sensor remote controller
110 attribute data correction part
111 time/frequency range data combination part
112 sensor position information storage part
113, 222 position estimation part
114 space range data aggregation part
115 output part
221 data combination part
801 sensor position measurement part
802 sensor position acquisition part

What is claimed is:

1. A transmission source position estimation system, comprising:
   at least one processor; and
   at least one memory storing executable instructions that, when executed by the at least one processor, causes the processor to perform as:
   a plurality of sensors, wherein each sensor:
      receives signal data of a transmitted wave,
      classifies a set of characteristic vectors obtained from the received signal data of a transmitted wave into subsets in a feature space, and
      extracts attribute data for each of the subsets, and outputs the extracted data as an attribute data sequence; and
   a position estimation apparatus that:
      combines matching attribute data from at least two of the plurality of sensors for at least one attribute with respect to a plurality of the attribute data sequences, and
      estimates the position of a transmission source from the combined attribute data and a position of one of the plurality of sensors that receives the transmitted wave.

2. The transmission source position estimation system according to claim 1, wherein, for a first attribute and a second data sequence attribute data included in a plurality of the attribute data sequences, the position estimation apparatus corrects the second attribute data sequence so as to maximize similarity degree of the second attribute data sequence with respect to the first attribute data sequences.

3. The transmission source position estimation system according to claim 2, wherein:
   each of the plurality of attribute data sequences includes a representative vector of the subsets of characteristic vectors as an element, and
   the position estimation apparatus corrects the representative vector of the second attribute data sequence, so as to maximize similarity degree of the representative vector of the first attribute data sequence and the representative vector of the second attribute data sequence, in a feature space or subspace of a feature space.

4. The transmission source position estimation system according to claim 3, wherein:
   the attribute data further includes variance or covariance of a subset of the characteristic vectors in a feature space as an element, and
   the position estimation apparatus approximates the subset of the characteristic vectors in a statistical model that uses representative vector and variance or covariance of corresponding attribute data, and corrects the representative vector of the second attribute data sequence, in order to maximize correlation between overlapping of a statistical model corresponding to the first attribute data sequence and overlapping of a statistical model corresponding to the second attribute data sequence.

5. The transmission source position estimation system according to claim 2, wherein an attribute data sequence where the number of attribute data sequences is largest among the plurality of attribute data sequences, is the first attribute data sequence.

6. The transmission source position estimation system according to claim 2, wherein an attribute data sequence where information amount or entropy is largest among the plurality of attribute data sequences, is the first attribute data sequence.

7. The transmission source position estimation system according to claim 1, wherein the characteristic vector includes receipt time, reception frequency and reception intensity as elements.

8. The transmission source position estimation system according to claim 1, wherein the position estimation apparatus that aggregates overlapping of wave source positions outputted by the position estimation part in a space range.

9. A transmission source position estimation method comprising:
   receiving signal data from a plurality of transmission sources;
   classifying a set of characteristic vectors obtained from received signal data of a transmitted wave, from one of the plurality of transmission sources, into subsets in a feature space;
   extracting attribute data for each of the subsets and outputting the extracted data as attribute data sequences;
   combining matching attribute data, from signal data from at least two of the transmission sources, for at least one attribute with respect to a plurality of the attribute data sequences; and
   estimating the position of a transmission source from the combined attribute data and a position of one of a plurality of sensors that receives a transmitted wave.

10. A non-transitory computer readable medium storing a transmission source position estimation program that causes a computer, installed in a position estimation apparatus, to execute processing comprising:
    receiving signal data from a plurality of transmission sources;
    classifying a set of characteristic vectors obtained from received signal data of a transmitted wave, from one of the plurality of transmission sources, into subsets in a feature space;
    combining matching attribute data, from signal data from at least two transmission sources, for at least one attribute with respect to a plurality of the attribute data sequences; and
    estimating the position of a transmission source from the combined attribute data and a position of one of a plurality of sensors that receives a transmitted wave.

11. The transmission source position estimation method according to claim 9, comprising:
    correcting, for a first attribute and a second data sequence attribute data included in a plurality of the attribute data sequences, the second attribute data sequence so as to maximize similarity degree of the second attribute data sequence with respect to the first attribute data sequences.

12. The transmission source position estimation method according to claim 11, wherein an attribute data sequence where the number of attribute data sequences is largest among the plurality of attribute data sequences, is the first attribute data sequence.

13. The transmission source position estimation method according to claim 11, wherein an attribute data sequence where information amount or entropy is largest among the plurality of attribute data sequences, is the first attribute data sequence.

14. The transmission source position estimation method according to claim 9, wherein the characteristic vector includes receipt time, reception frequency and reception intensity as elements.

15. The transmission source position estimation method according to claim 9, comprising:
    aggregating overlapping of wave source positions outputted by the position estimation part in a space range.

16. The non-transitory computer readable medium storing a transmission source position estimation program according to claim 10, to execute processing comprising:
    correcting, for a first attribute and a second data sequence attribute data included in a plurality of the attribute data sequences, the second attribute data sequence so as to maximize similarity degree of the second attribute data sequence with respect to the first attribute data sequences.

17. The non-transitory computer readable medium storing a transmission source position estimation program according to claim 16, wherein an attribute data sequence where the number of attribute data sequences is largest among the plurality of attribute data sequences, is the first attribute data sequence.

18. The non-transitory computer readable medium storing a transmission source position estimation program according to claim 16, wherein an attribute data sequence where information amount or entropy is largest among the plurality of attribute data sequences, is the first attribute data sequence.

19. The non-transitory computer readable medium storing a transmission source position estimation program according to claim 10, wherein the characteristic vector includes receipt time, reception frequency and reception intensity as elements.

20. The non-transitory computer readable medium storing a transmission source position estimation program according to claim 10, comprising:
    aggregating overlapping of wave source positions outputted by the position estimation part in a space range.

* * * * *